W. BECKMANN.
ARRANGEMENT FOR DRIVING TACHOMETERS ON LOCOMOTIVES.
APPLICATION FILED MAY 19, 1914.
1,254,567. Patented Jan. 22, 1918.
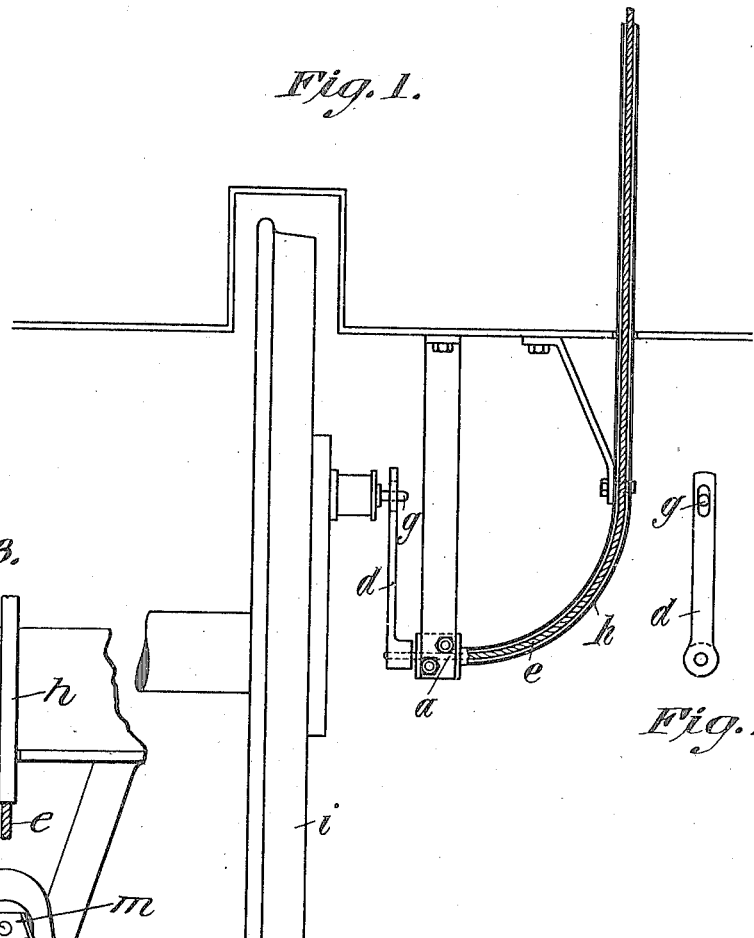
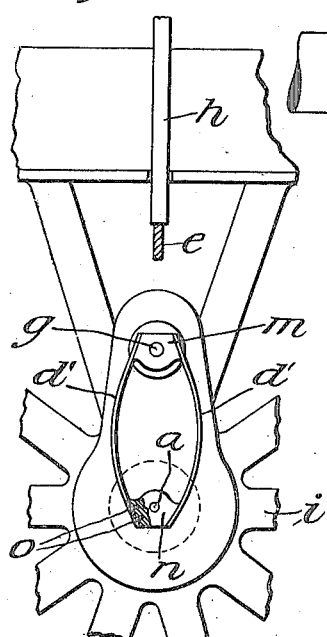

UNITED STATES PATENT OFFICE.

WILHELM BECKMANN, OF BERLIN, GERMANY.

ARRANGEMENT FOR DRIVING TACHOMETERS ON LOCOMOTIVES.

1,254,567.     Specification of Letters Patent.     Patented Jan. 22, 1918.

Application filed May 19, 1914. Serial No. 839,662.

*To all whom it may concern:*

Be it known that I, WILHELM BECKMANN, subject of the King of Prussia, residing at Berlin, Germany, have invented certain new and useful Improvements in the Arrangement for Driving Tachometers on Locomotives, of which the following is a specification.

Compared to the already known means for driving locomotive tachometers, in which almost always gearings are used, the subject matter of the present invention has considerable advantages. The present invention obviates the use of gearing which renders the drive expensive and complicated and therefore easily gives rise to trouble. On the other hand the advantage is secured that the transmission shaft is situated throughout its entire length at a higher level.

In the accompanying drawing the present invention is exemplified, Figure 1 being an elevation, partly in section showing one form of the device, Fig. 2 being a detail view of one of the elements disclosed in Fig. 1, and Fig. 3 being a side elevation, partly in section, showing another form of the invention.

The rotary motion of a wheel $i$ of the locomotive or of a connecting rod coupled to the wheels of the locomotive is transmitted in known manner to a shaft $a$ journaled in the upper frame of the locomotive. This transmission of the motion is obtained by a pin $g$ being provided on a wheel $i$ of the locomotive, or on a crank on the same, or also on a connecting rod. This pin $g$ performs a circular movement and transmits this movement to a lever or fork $d$, which is coupled to the shaft $a$. To the rigid shaft $a$ is directly coupled, without the use of any intermediate gearing, a flexible shaft $e$. The flexible shaft $e$ revolves in a sheath or tube $h$ and drives the tachometer in the driver's cabin. The sheath or guard tube $h$ is rigidly attached to the bearing of the shaft $a$, and forms a tight joint therewith, so that no dirt or dust can enter. The bearing of shaft $a$ must be so arranged, that when the engine is under normal load it will be in the center of the circular path of the pin $g$. Any movements caused by the play of the springs of the engine will be compensated by the lever or fork $d$ being adapted to move relatively to the pin $g$. Instead of transmitting the movement by means of a pin, a lever or a fork, a spring may also be employed in a suitable manner, which forms an elastic connection between the locomotive wheel or the connecting rod and the lever $d$ or the shaft $a$ and will, by its elasticity compensate for the oscillations of the frame of the locomotive. This arrangement has the advantage, that the trouble which may be caused by the unavoidable wear of the pin and the fork or the lever as a consequence of the oscillations of the locomotive, may be avoided.

In Fig. 3, which exemplifies the above mentioned modification, the shaft $a$ and the pin $g$ are spanned by a spring yoke consisting of a block $m$ journaled upon the pin $g$, block $n$ journaled on the shaft $a$, and leaf springs $d'$ secured to the opposite sides of said blocks, as by screws $o$. Said springs $d'$ are bowed in opposite directions in order to provide a suitably tensioned connection between the pin $g$ and shaft $a$ under rotation of the wheel $i$ in either direction. As the framework of the locomotive changes its position relative to the wheel $i$ under the compression and expansion of the locomotive springs, the springs $d'$ also contract and expand to make allowances for the shortening and lengthening of the space between the pin $g$ and shaft $a$.

I claim:

1. A driving mechanism for locomotive tachometers, comprising, in combination a crank having at one end a connection with one element of the running gear of the locomotive, so as to be rotated thereby, such connection being disposed eccentrically of said element; a shaft carried by the locomotive framework and connected directly to the other end of said crank; said shaft being disposed in axial alinement with the center about which said crank rotates, and said crank including in it a yielding connection to compensate for variations in the distance between the axes of said shaft and said eccentric connection due to the vertical motion of said framework relative to said running gear when the driving mechanism is in action; and a connection between said shaft and the tachometer to drive the latter from the former.

2. A device for driving locomotive tachometers, comprising in combination, a shaft carried by the locomotive framework, a rotative element driven by the locomotive running gear, a driving connection between said rotative element and said shaft, said driving connection including spring means to compensate for the vertical motion of the locomotive framework relative to the running gear, and a flexible shaft directly connected to the first mentioned shaft.

In testimony whereof I have affixed my signature in presence of two witnesses.

WILHELM BECKMANN.

Witnesses:
WOLDEMAR HAUPT,
HENRY HASPER.

Copies of this patent may be obtained for five cents each, by addressing the "Commissioner of Patents, Washington, D. C."